(12) United States Patent
Kientz et al.

(10) Patent No.: US 7,697,229 B2
(45) Date of Patent: Apr. 13, 2010

(54) METHOD AND SYSTEM FOR WRITING INFORMATION TO A TAPE CARTRIDGE

(75) Inventors: Steven Michael Kientz, Westminster, CO (US); Matthew P. Wojciechowski, Erie, CO (US)

(73) Assignee: Sun Microsystems Inc., Santa Clara, CA (US)

( * ) Notice: Subject to any disclaimer, the term of this patent is extended or adjusted under 35 U.S.C. 154(b) by 0 days.

(21) Appl. No.: 12/141,984

(22) Filed: Jun. 19, 2008

(65) Prior Publication Data

US 2009/0316287 A1    Dec. 24, 2009

(51) Int. Cl.
*G11B 23/30* (2006.01)

(52) U.S. Cl. ........................................ 360/69

(58) Field of Classification Search ...................... None
See application file for complete search history.

(56) References Cited

U.S. PATENT DOCUMENTS 7,530,515 B2 *   5/2009   Battles et al. ............ 242/332.4

\* cited by examiner

*Primary Examiner*—Hoa T Nguyen
*Assistant Examiner*—James L Habermehl
(74) *Attorney, Agent, or Firm*—Brooks Kushman P.C.

(57) ABSTRACT

A tape drive system for a tape cartridge including a tape and wireless identification tag may read information from the wireless identification tag and write the information to the tape. The tape drive system may toggle a bit stored on the wireless identification tag to indicate that the information has been written to the tape. The information may include tape initialization information.

17 Claims, 2 Drawing Sheets

METHOD AND SYSTEM FOR WRITING INFORMATION TO A TAPE CARTRIDGE

BACKGROUND

1. Field

Embodiments of the invention relate to methods and systems for writing information to tape cartridges.

2. Discussion

A data tape cartridge may be written by multiple generations of tape drives. Each generation may increase the capacity of the tape by increasing the number of tracks recorded to the tape and/or by changing the tape format. When a tape recorded with one format is loaded into a newer generation drive with a different format, the older data format may not be appended to. To write with the new generation drive, the tape must be reclaimed—overwriting the older format data.

In some tape drive applications, certain header data, e.g., tape volume header information and application format data, may be written to the tape by the drive. This process is commonly known as initialization. Such data is typically written to the tape using a drive by the media manufacturer. The initialized tape may then be sold to customers at a premium price.

Data may be written to tape using the data format of the drive writing the data. An issue may arise if the tape is loaded onto a new generation drive for the purpose of recording customer data. For example, any header data may not be appended to and must be rewritten by the new drive. This process may involve reading the header data from the tape, rewinding and rewriting the header records to the tape. This process may be time consuming and costly. Additionally, the ability to read older tapes is not always available and/or reliable.

SUMMARY

A method for writing information to a tape of a tape cartridge including a wireless identification tag includes reading information from the wireless identification tag and writing the information to the tape.

The method may include determining whether to write the information to the tape.

The method may include toggling a bit stored on the wireless identification tag to indicate that the information has been written to the tape.

A tape drive system for a tape cartridge having a tape and a wireless identification tag includes a tape drive configured to load the tape, read information from the wireless identification tag and write the information to the tape.

The tape drive system may be further configured to determine whether to write the information to the tape based on the information.

The tape drive system may be further configured to determine whether to initialize the tape based on the information.

The tape drive system may be further configured to toggle a bit stored on the wireless identification tag to indicate that the information has been written to the tape.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

During manufacturing, wireless memory chips, such as radio frequency identification (RFID) tags, enclosed within or affixed to an exterior of a tape cartridge may be programmed with basic manufacturing information, initialization information, custom customer data, data set tables, tape usage statistics, etc. If such a tape cartridge is loaded into a tape drive, the tape drive may detect the information stored on the chip and may transfer at least some of the information from the chip to the tape. For example, header information stored on the chip may be transferred to the tape as part of an automatic initialization process to ensure that the header information is in the correct format for the tape drive. Additionally, if the tape is later reclaimed on a different drive type, a bit on the chip may be set to transfer the header information from the chip as part of a reclaim operation. This same technique may be applied to any information, including format dependent information such as special recording patterns designed to identify the format of recording on the tape.

Figure 1:
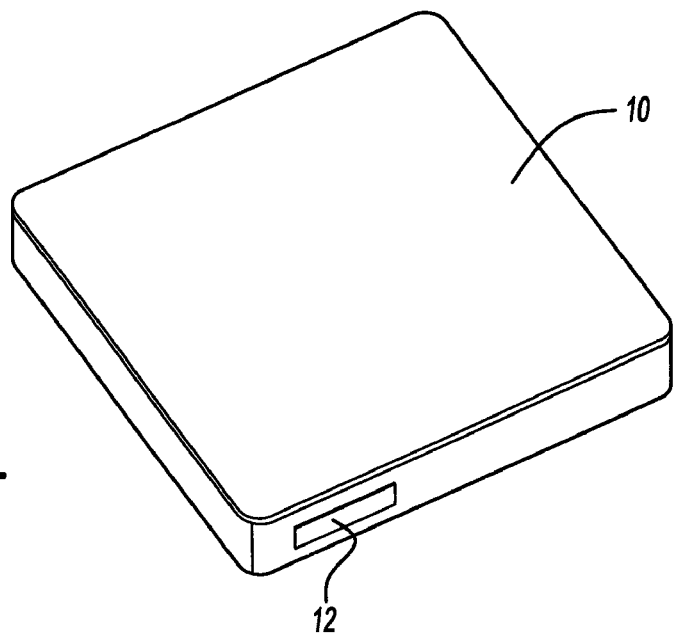
FIG. 1 is perspective view of an embodiment of a tape cartridge.

Referring now to FIG. 1, a tape cartridge 10 may include a wireless identification tag 12, e.g. a radio frequency identification (RFID) tag, affixed to an exterior of the tape cartridge 10. The wireless identification tag 12 may be divided into physical zones each having a specified number of bytes. For example, the tag 12 may be divided into 16 zones of 256 bytes each. The tag 12 may also be divided into 32 zones of 128 bytes each, etc.

Data stored in the tag 12 may be grouped into user data sectors. Some sectors may occupy more than one physical zone. Other sectors may occupy a portion of a single zone. Table 1 lists an example set of sector names and sector numbers and is followed by an example description of some of the sectors. Any suitable sector configuration, however, may be used.

TABLE 1

| Sector Name | Sector Number |
|---|---|
| Tape_ID | 1 |
| Tape Validity Data | 2 |
| TAPE_INF0 | 3 |
| EOD_INFO | 4 |
| TAPE_STATISTICS | 5 |
| TAPE_RECORD_1 | 6 |
| Backup Validity Data | 7 |
| TAPE_RECORD_2 | 8 |
| TAPE_RECORD_3 | 9 |
| ENDPOINT_BLKIDS | 10 |
| Tape Defect Locations | 11 |

Tape ID: Sector 1

This sector may be programmed at the media manufacturer and written to Physical Zone 0 on the tag 12. This sector may be the only write protected sector in the tag 12. Data written to this sector may include a cartridge serial number, ink jet number, cartridge type, RFID format, nominal tape length identifier, nominal tape thickness identifier, empty hub diameter identifier and/or leader tape type identifier, etc.

Tape Validity Data: Sectors 2 and 7

These sectors may include data for the usage of a tape table of contents located on the tape. This may include flags to indicate a validity of the table of contents, a state of the tag 12, whether the tape is write-protected, whether the tape has been initialized, data cartridge class, and/or the highest write operations on the tape. These sectors may also include information on the type of tape and/or the number of times a cleaning tape has been used. The physical location of the table of contents may also be included in these sectors.

Tape Records: Sectors 6, 8 and 9

These sectors may contain information such as the tape volume serial number and tape header information. The tape header information may include tape initialization information such as volume serial number record, header record, etc. Other information, such as media supplier name, cost of the tape, historical information, usage information and media formulation information, may also be stored in these sectors. As explained in detail below, this information may be read by a tape drive system and written to the tape.

End Of Data Information: Sector 4

This sector may include the transverse position of the data on the tape (wrap number), the Host Logical Record value, current write operations count and longitudinal location of the End of Data block. This data may also be recorded for the most recent data security erase (if any).

Tape Statistics: Sector 5

This sector may contain information on cartridge usage including tape load counts, tape footage counts, tape alert flags, Mbytes of data written, last writing, drive serial number and the number of unsuccessful loads.

Endpoint Block_IDs: Sector 10

This sector may fill up several zones of the tag 12 and may contain data on half wrap boundaries. In some embodiments, there may be, for example, 48 half wraps or 72 half wraps. Each half wrap data may include, for example, a last Host Logical Record in the half wrap, a last write operations count, a last matrix block count and validity bits.

Discontinuities: Sector 11

This sector may fill up the remainder of the tag 12. If any discontinuities exist on the tape (write operations count may not be contiguous), a matrix block count before the discontinuity and a write operations before and after the discontinuity may be recorded.

Figure 2:
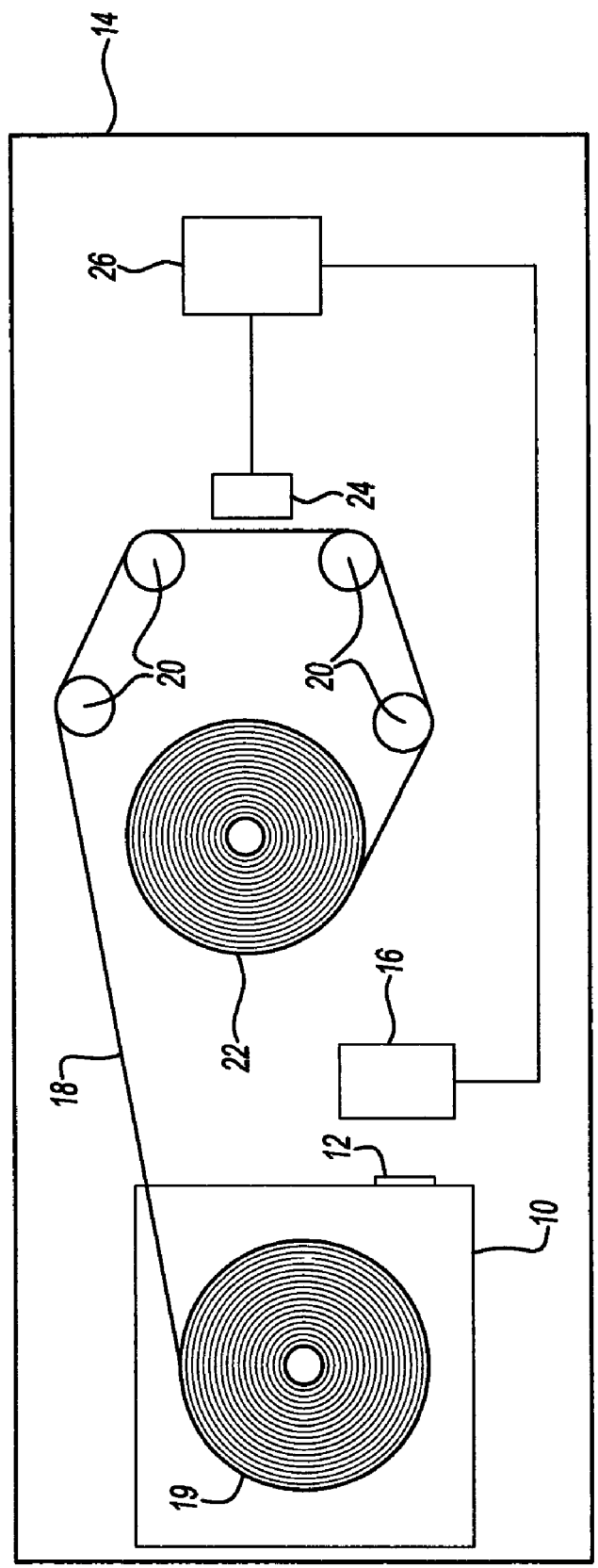
FIG. 2 is a perspective view of a portion of an embodiment of a tape drive system and the embodiment of the tape cartridge of FIG. 1.

Referring now to FIG. 2, the tape cartridge 10 has been loaded into a tape drive 14. The tape drive 14 includes a transceiver 16, e.g., RFID reader/writer module, that may wirelessly communicate with the tag 12. For example, the transceiver 16 may wirelessly read information from and/or write information to the tag 12.

In the embodiment of FIG. 2, the tape drive 14 guides a tape 18 from a cartridge reel 19 of the tape cartridge 10 around tape path rollers 20 to a drive take up reel 22. A read/write head 24 positioned adjacent to a path of the tape 18 may read information from and/or write information to the tape 18 as the tape 18 passes by the read/write head 24. Other tape drive configurations, however, are also possible.

The transceiver 16 and read/write head 24 communicate with a microprocessor 26 of the tape drive 14. As explained in detail below, the microprocessor 26 may receive initialization information, or other types of information, stored on the tag 12 via the transceiver 16 and write that information to the tape 18 via the read/write head 24.

Figure 3:
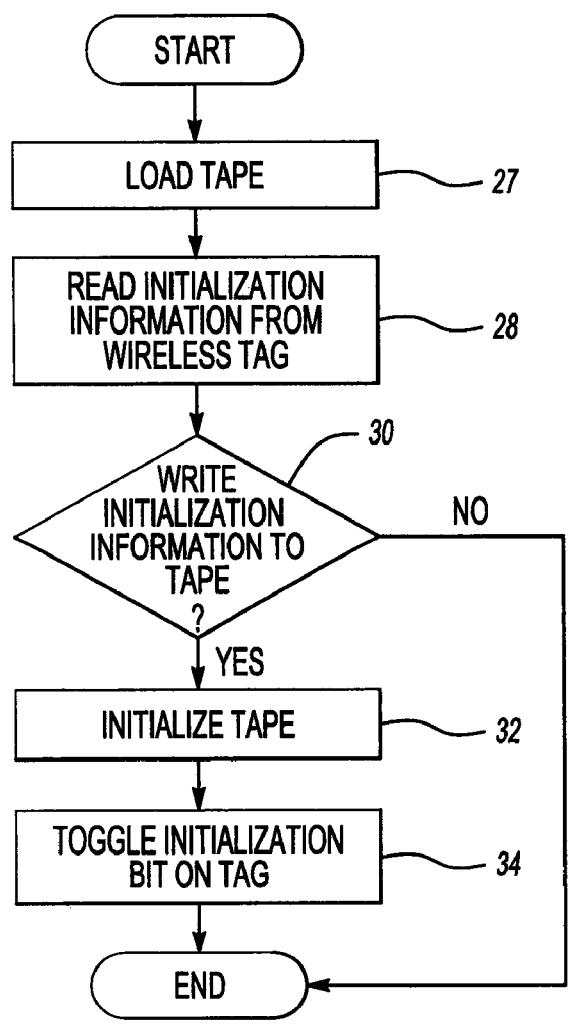
FIG. 3 is flow chart depicting an embodiment of a strategy for initializing the tape cartridge of FIG. 1.

Referring now to FIGS. 2 and 3, the tape cartridge 10 is loaded into the tape drive 14 so that a portion of the tape 18 is adjacent to the read/write head 24 as indicated at 27. As indicated at 28, the transceiver 16 reads initialization information from the tag 12 stored, in this embodiment, in any of sectors 6, 8 and 9 as discussed above. In other embodiments, however, the information may be stored in any desired sector on the tag 12. As indicated at 30, the microprocessor 26 determines whether to write the initialization information to the tape 18. In the embodiment of FIGS. 2 and 3, this determination is made by inspecting an initialization bit stored on the tag 12. If the bit is low, the tape 18 has not been initialized. If the bit is high, the tape 18 has been initialized. Any suitable technique, however, may be used to determine whether to write the initialization information to the tape 18.

If the tape 18 has not been initialized, the tape drive 14 initializes the tape 18 by, for example, writing at least a portion of the initialization information to the tape 18 via the read/write head 24 as indicated at 32. As indicated at 34, the tape drive 14 then toggles the initialization bit stored on the tag 12 via the transceiver 16 to indicate that the tape 18 has been initialized.

By storing, for example, the contents of header records, etc., in the tag 12, the tape 18 may be automatically initialized by the tape drive 14 the first time it is loaded into the tape drive 14, regardless of the drive generation. This may eliminate the need for media manufactures to load tapes into tape drives during production. This may also lower the overhead cost of manufacturing because, for example, media manufacturers need not purchase tape drives for initialization processes.

The data stored on the tag 12 may provide redundancy for circumstances where data stored on the tape 18 is lost. Additionally, faster access times of data written from the tag 12 to the tape 18 may be possible as the tape drive 14 may have knowledge of where such data is located on the tape 18.

As apparent to those of ordinary skill, a reverse of the process discussed above is also possible. For example, information read from the tape 18 by the read/write head 24 may be stored on the tag 12 via the transceiver 16, etc.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for initializing a tape of a tape cartridge including a radio frequency identification tag, the tape cartridge being loaded into a tape drive, the method comprising:

reading initialization information from the radio frequency identification tag;

initializing the tape with at least a portion of the initialization information;

reading information from the tape; and storing at least a portion of the information read from the tape on the radio frequency identification tag.

2. The method of claim 1 further comprising determining whether to initialize the tape.

3. The method of claim 2 wherein the determination whether to initialize the tape is based on the initialization information.

4. The method of claim 2 wherein the initialization information includes information indicative of whether the tape has been initialized.

5. The method of claim 1 further comprising toggling a bit stored on the radio frequency identification tag to indicate that the tape has been initialized.

6. A method for writing information to a tape of a tape cartridge including a wireless identification tag, the tape cartridge being loaded into a tape drive, the method comprising:
- reading information from the wireless identification tag;
- writing the information to the tape;
- reading information from the tape; and
- storing at least a portion of the information read from the tape on the wireless identification tag.

7. The method of claim 6 wherein the information written to the tape includes initialization information.

8. The method of claim 7 wherein the initialization information includes information indicative of whether the tape has been initialized.

9. The method of claim 7 further comprising determining whether to initialize the tape.

10. The method of claim 9 wherein the information written to the tape includes at least a portion of the initialization information.

11. The method of claim 6 further comprising toggling a bit stored on the wireless identification tag to indicate that the information has been written to the tape.

12. The method of claim 6 further comprising determining whether to write the information to the tape.

13. A tape drive system for a tape cartridge including a tape and a wireless identification tag, the system comprising:
- a tape drive configured to load the tape, read information from the wireless identification tag, write the information to the tape, read information from the tape, and store at least a portion of the information read from the tape on the wireless identification tag.

14. The system of claim 13 wherein the tape drive is further configured to determine whether to initialize the tape based on the information.

15. The system of claim 13 wherein the tape drive is further configured to determine whether to write the information to the tape based on the information.

16. The system of claim 13 wherein the tape drive is further configured to toggle a bit stored on the wireless identification tag to indicate that the information has been written to the tape.

17. The system of claim 13 wherein the information includes initialization information.

* * * * *